Figure 1:
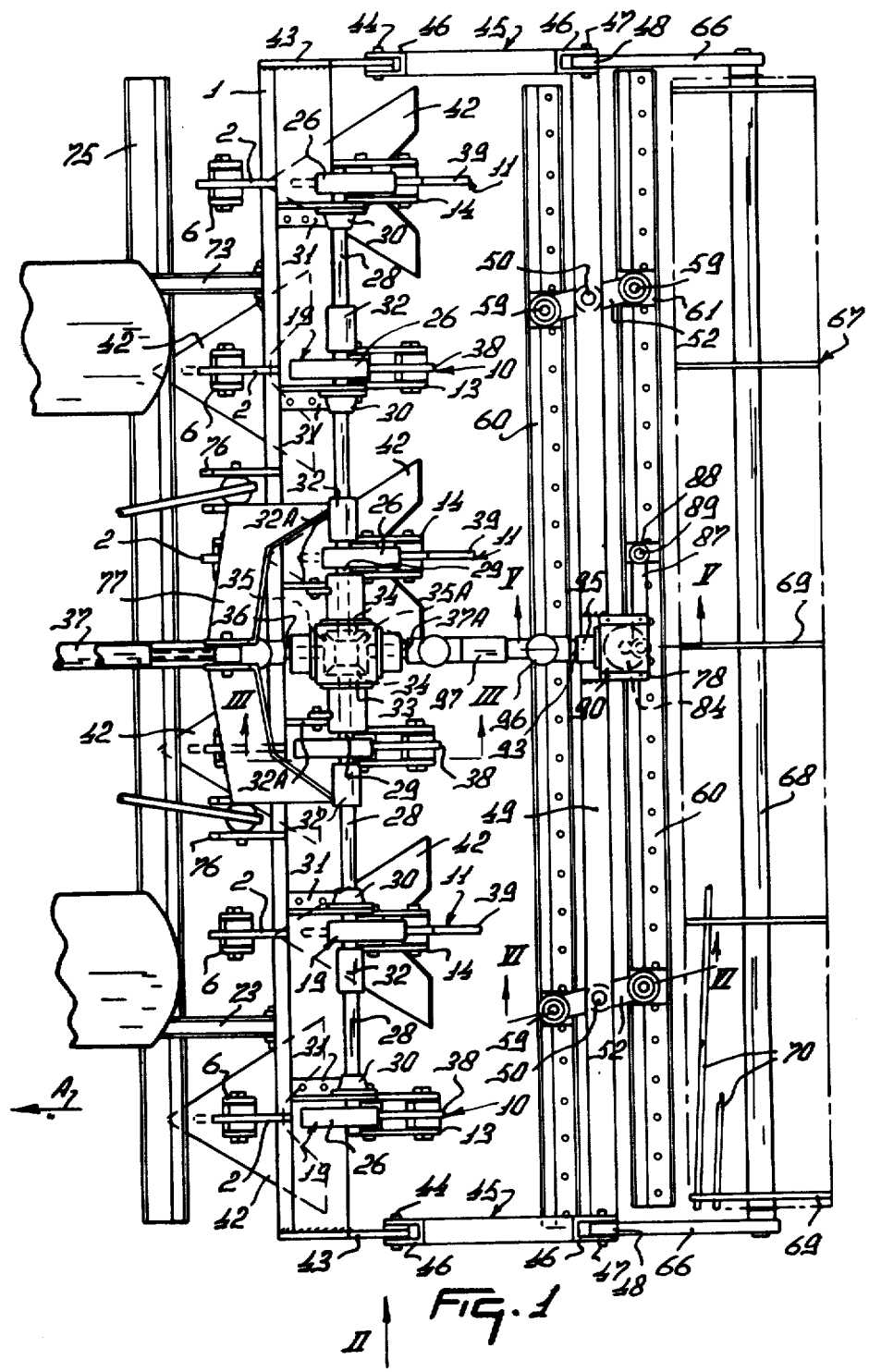

United States Patent [19]
van der Lely

[11] 4,187,914
[45] Feb. 12, 1980

[54] SOIL CULTIVATING IMPLEMENTS

[76] Inventor: Cornelis van der Lely, 7 Brüschenrain, Zug, Switzerland

[21] Appl. No.: 836,774

[22] Filed: Sep. 26, 1977

[30] Foreign Application Priority Data

Oct. 1, 1976 [NL] Netherlands ............. 7610861

[51] Int. Cl.² .................. A01B 11/00; A01B 19/06
[52] U.S. Cl. ................................. 172/53; 172/54;
172/56; 172/70; 172/102; 172/125
[58] Field of Search ............. 172/53, 54, 102, 40,
172/63, 691, 713, 196, 198, 70, 71, 72, 118, 699,
50, 68, 149, 179, 177, 1, 47, 48, 56, 60, 101, 125;
273/1.5 R

[56] References Cited

U.S. PATENT DOCUMENTS

| 2,313,188 | 3/1943 | Woodburn | 273/1.5 R |
|---|---|---|---|
| 3,100,018 | 8/1963 | Sokolowski | 172/198 X |
| 3,336,985 | 8/1967 | Rogers | 172/40 |
| 3,791,453 | 2/1974 | Oosterling | 172/53 |
| 3,823,780 | 7/1974 | Guerin | 172/53 X |
| 3,960,219 | 6/1976 | Lely | 172/60 X |
| 3,983,943 | 10/1976 | Lely | 172/70 |

FOREIGN PATENT DOCUMENTS

| 911789 | 5/1954 | Fed. Rep. of Germany | 172/63 |
|---|---|---|---|
| 767411 | 5/1934 | France | 172/40 |
| 680859 | 6/1965 | Italy | 172/102 |
| 276769 | 10/1964 | Netherlands | 172/40 |
| 404275 | 12/1965 | Switzerland | 172/53 |
| 1114240 | 5/1968 | United Kingdom | 53/ |

OTHER PUBLICATIONS

Lubbock Mfg. Co., Advertising Circular & Data Sheet 11-1974.

*Primary Examiner*—Paul E. Shapiro
*Attorney, Agent, or Firm*—Mason, Mason and Albright

[57] ABSTRACT

An implement has a forward row of soil working members that have flat blades and the blades are periodically raised and lowered to initially coarsely break the soil with pivotal motions induced by respective eccentrics mounted on a horizontal shaft. The members have respective polygonal linkage connections to the frame. Further soil working members that include elongated bars with tines are moved to and fro to work the upper layer of coarsely broken soil. The bars are pivoted about upwardly extending pivots and an eccentric reciprocates the bars in relative opposite directions. A trailing roller is linked to the bars and to the frame supporting the bladed members. The bars and roller are interconnected to the frame sides by parallelogram linkages that can be fixed to regulate the working depths of the blades and the tines.

14 Claims, 8 Drawing Figures

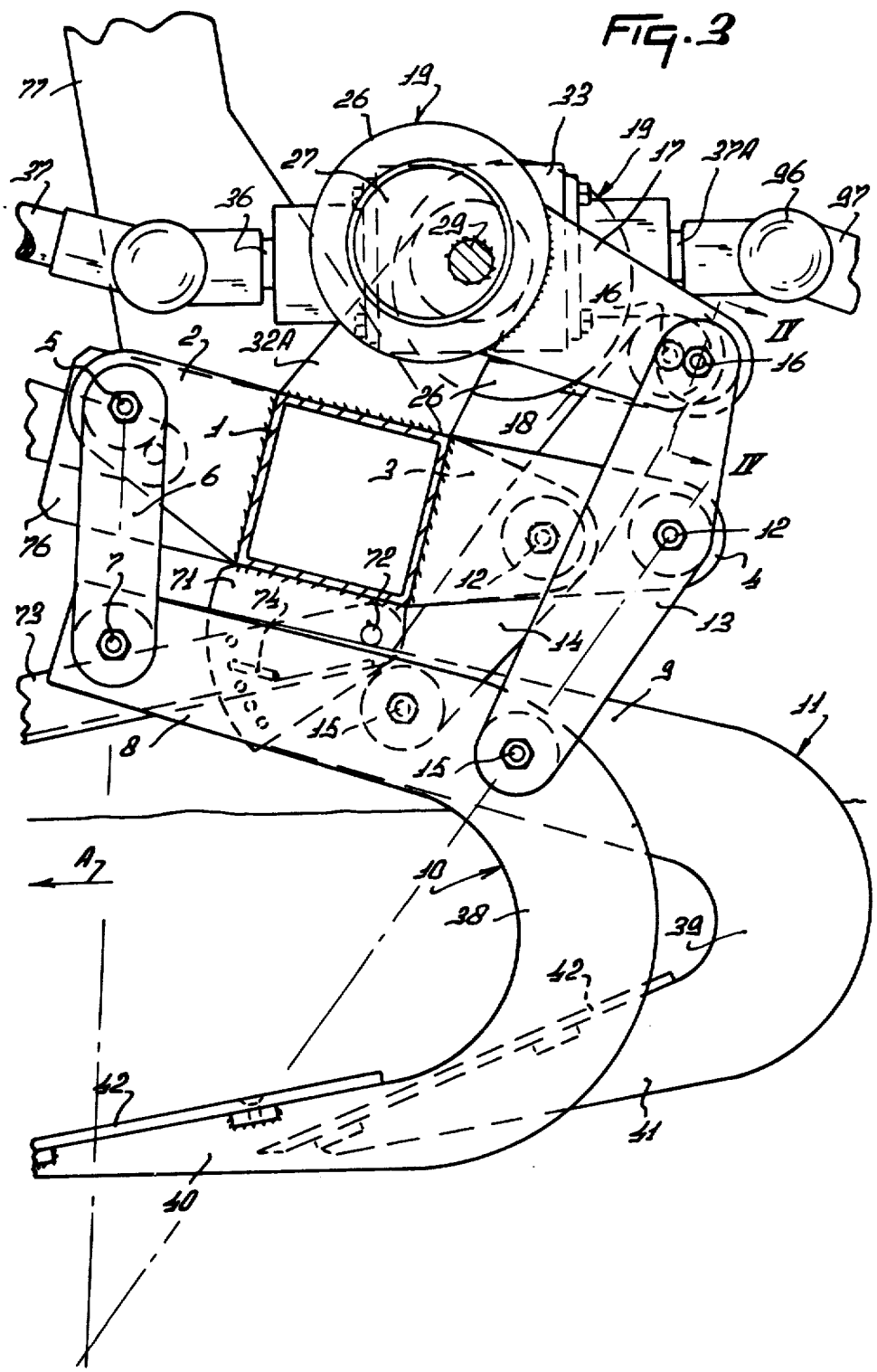

SOIL CULTIVATING IMPLEMENTS

According to one aspect of the invention, there is provided a soil cultivating implement of the kind set forth, wherein further soil working members are arranged to the rear of the first-mentioned soil working members with respect to the intended direction of operative travel of the implement in positions in which they will work a layer of the soil worked by the foregoing members, means being provided to cause said further soil working members to move to and fro, during the use of the implement, in directions that are transverse to said direction of travel.

Figure 2:
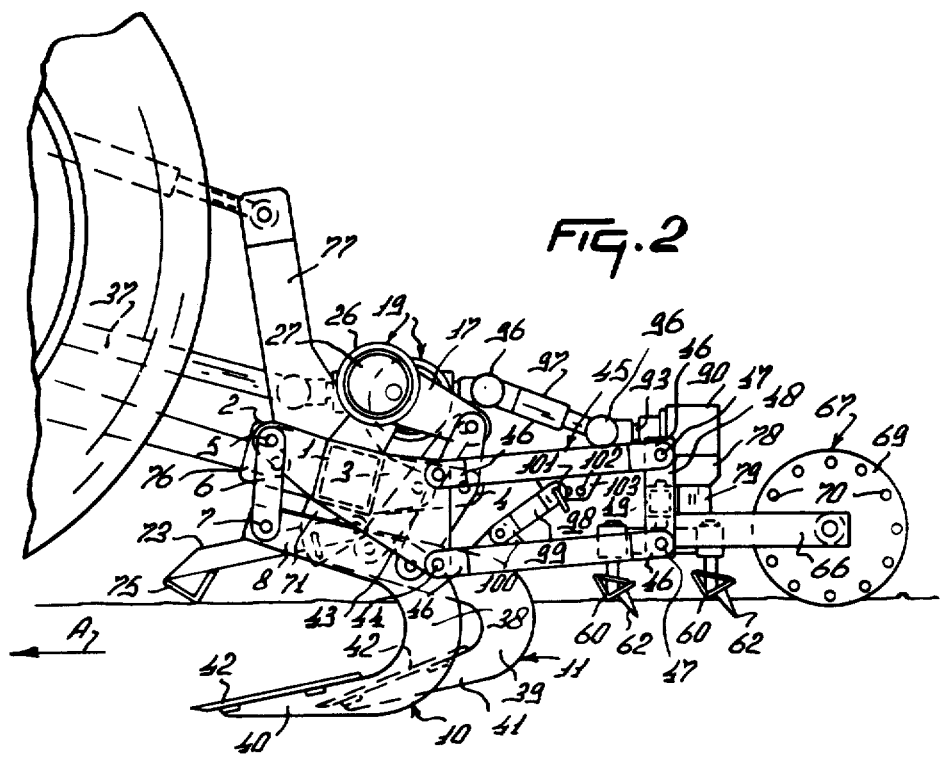
Figure 4:
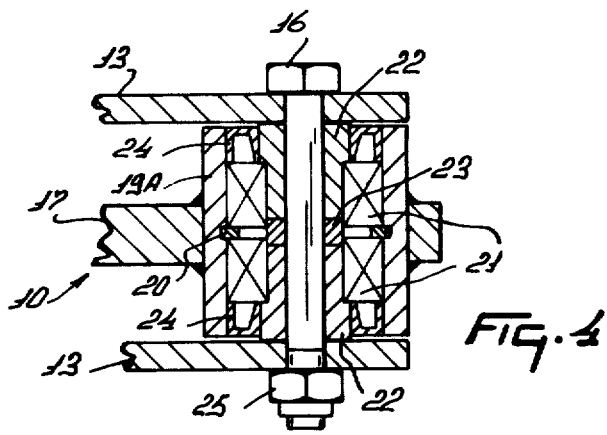
Figure 5:
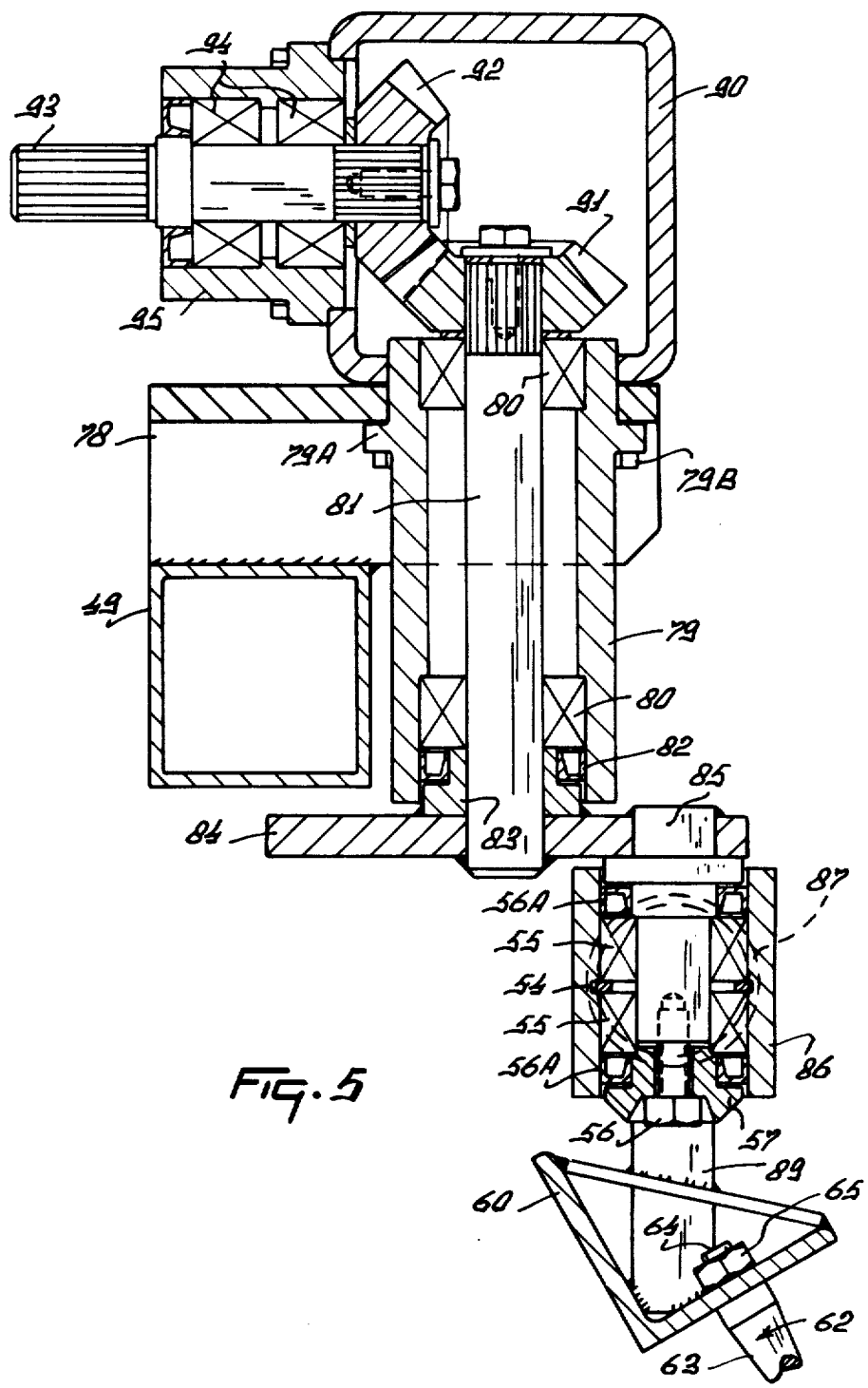
Figure 6:
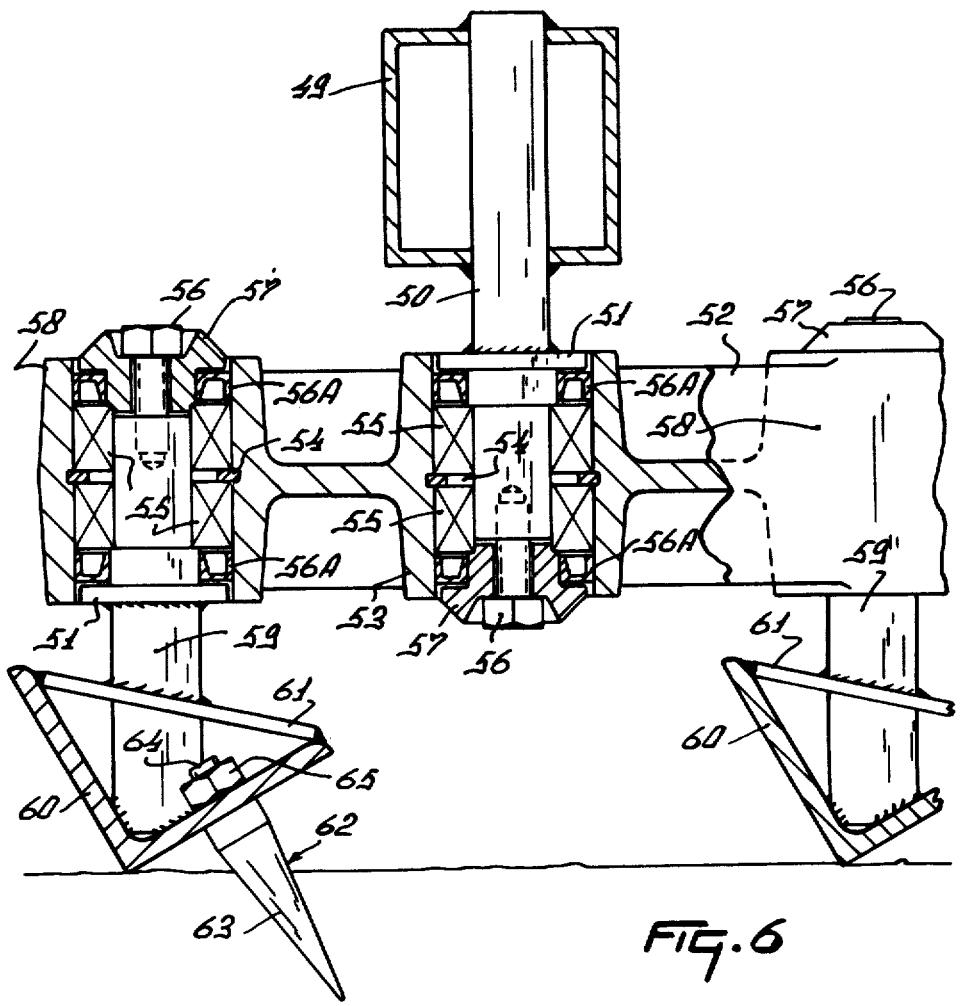
Figure 8:
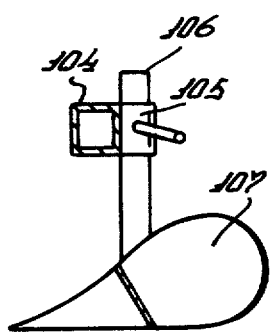
Figure 7:
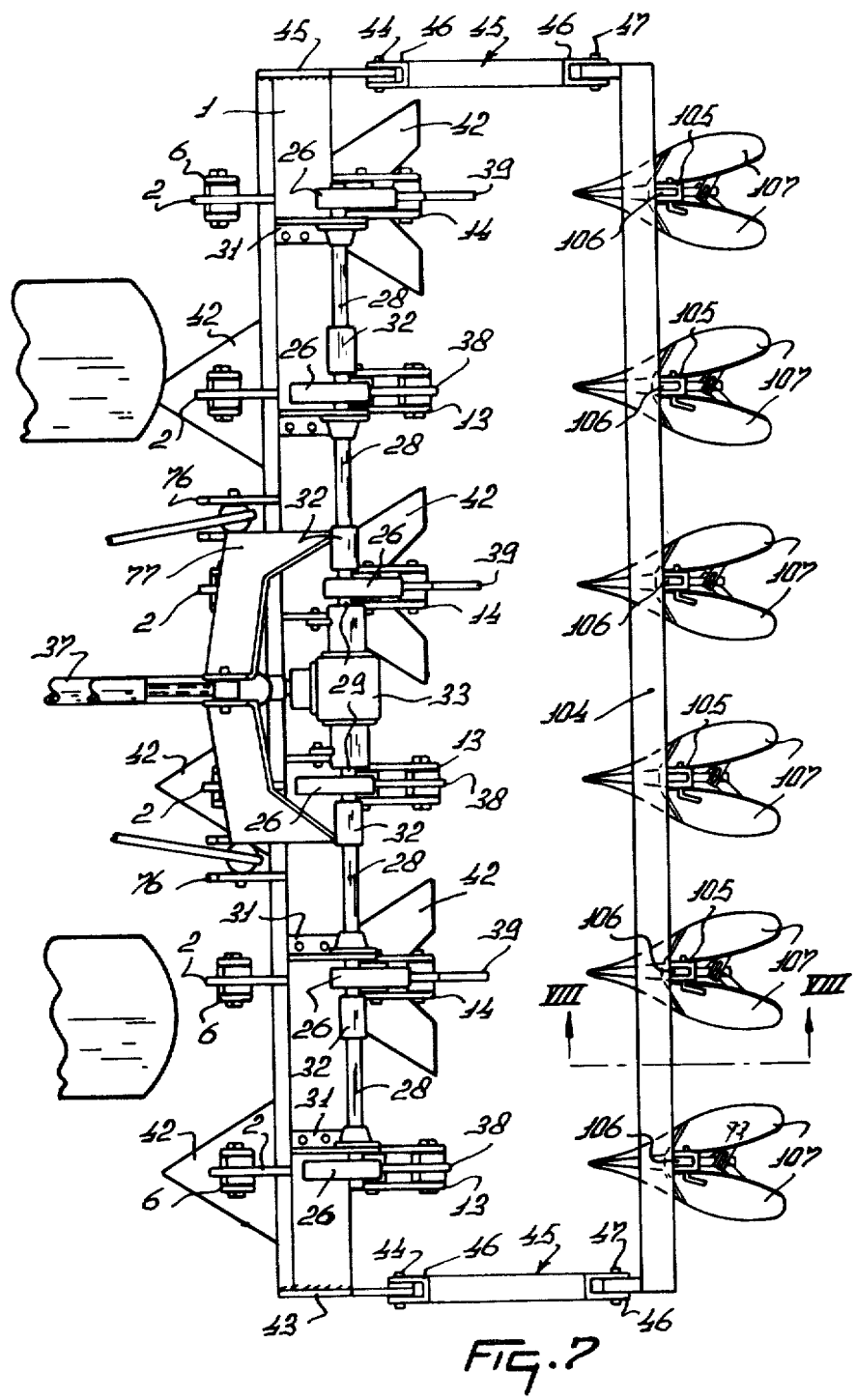

For a better understanding of the invention, and to show how the same may be carried into effect, reference will now be made, by way of example, to the accompanying drawings, in which:

FIG. 1 is a plan view of a soil cultivating implement in accordance with the invention connected to the rear of an agricultural tractor, FIG. 2 is a side elevation as seen in the direction indicated by an arrow II in FIG. 1, FIG. 3 is a section, to an enlarged scale, taken on the line III—III in FIG. 1, FIG. 4 is a section, to an enlarged scale, taken on the line IV—IV in FIG. 3, FIG. 5 is a section, to an enlarged scale, taken on the line V—V in FIG. 1, FIG. 6 is a section, to an enlarged scale, taken on the line VI—VI in FIG. 1, FIG. 7 is a plan view of an alternative form of soil cultivating implement in accordance with the invention connected to the rear of an agricultural tractor, and FIG. 8 is a section, to an enlarged scale, taken on the line VIII—VIII in FIG. 7.

Referring to FIGS. 1 to 6 of the accompanying drawings, the soil cultivating implement or machine that as illustrated therein has a frame which comprises a beam 1 that extends substantially horizontally transverse, and usually perpendicular, to the intended direction of operative travel of the implement which is indicated in several Figures of the drawings by an arrow A. The beam 1 is of hollow formation and has a polygonal cross-section which is preferably the square cross-section that is illustrated in the drawings, the beam 1 being so disposed that, whatever its polygonal cross-section, a lower surface thereof is inclined upwardly and forwardly with respect to the direction A at a few degrees to the horizontal. Six supports 2 project forwardly from the front of the beam 1 at regular intervals along the length of that beam, the supports 2 that are at the opposite ends of the row thereof being spaced from the adjacent opposite ends of the beam 1 itself by distances which are substantially half the distance between two neighbouring supports 2 of said row. Three supports 3 and three supports 4 project rearwardly from the frame beam 1 with respect to the direction A at locations which are in register, in that direction, with the leading supports 2, the supports 3 and 4 (FIG. 3) being of different rearwardly projecting lengths and being arranged in alternate relationship along the length of the frame beam 1. Since the supports 3 and 4 register with the supports 2 in the direction A, the supports 3 and 4 at the opposite ends of the row thereof are again spaced from the adjacent opposite ends of the frame beam 1 itself by distances which are substantially equal to half the spacing between neighbouring supports 3 and 4 in the row thereof. Two downwardly extending arms 6 are turnably mounted at the opposite sides of each leading support 2 with the aid of a corresponding pivot bolt 5 that defines a substantially horizontal axis that is parallel to the longitudinal axis of the frame beam 1. The lower ends of the pairs of arms 6 are turnably connected by corresponding further parallel pivot bolts 7 to the opposite sides of fastening portions 8 and 9 of soil working members that are in the form of two differently proportioned tines 10 and 11 that are both of hook-shaped configuration. The tines 10 and 11 will be described in greater detail below.

Pivot bolts 12 that are substantially horizontally parallel to the pivot bolts 5 and 7 turnably connect intermediate points on pairs of arms 13 to the rearwardly extending supports 4 and, similarly, turnably connect intermediate points on pairs of arms 14 to the supports 3. As can be seen in FIG. 3 of the drawings, the pairs of arms 13 and 14 extend generally downwardly and forwardly with respect to the direction A from their uppermost to their lowermost ends at a few degrees to the vertical, their lowermost ends being turnably connected by more parallel pivot bolts 15 to locations on the fastening portions 8 and 9 of the tines 10 and 11, said locations being spaced rearwardly along the fastening portions from the corresponding pivot bolts 7. The upper ends of the pairs of arms 13 and 14 are turnably connected by further parallel pivot bolts 16 to the opposite sides of arms 17 and 18, respectively. The arms 17 and 18 form parts of corresponding eccentric mechanisms 19 and extend principally forwardly from the corresponding pivot bolts 16, with respect to the direction A, to have their leading ends welded to rings 26 of said mechanisms 19 that will be further described below.

Each of the pivot bolts 5, 7, 12, 15 and 16 forms part of a corresponding pivot bearing, the construction of one such pivot bearing that comprises one of the pivot bolts 16 being shown in detail in FIG. 4 of the drawings. It will be seen from FIG. 4 that each of the arms 17, and similarly each of the supports 2, 3 and 4 and each of the fastening portions 8 and 9, is formed with a circular hole in which a corresponding cylindrical bush 19A is welded or otherwise rigidly secured. The bush 19A that is illustrated in FIG. 4 of the drawings is formed with an internal groove midway along its axial length and said groove receives the outer edge of a resilient circlip 20. The outer races of two roller bearings 21 abut against opposite sides of the circlip 20, the inner races of the two roller bearings 21 being arranged around narrowed portions of internal bushes 22 so as to abut against shoulders that are formed between said narrowed portions and portions thereof that are of larger diameter. The narrowed portions of the two internal bushes 22 extend close to the axial center of the cylindrical bush 19A but are separated at that centre by a ring 23 formed from a synthetic material such, for example, as a synthetic plastics material. The larger diameter portions of the two internal bushes 22 are surrounded by corresponding oil/grease seals 24 whose radially outer surfaces bear against the internal surface of the cylindrical bush 19A. The opposite axial ends of the cylindrical bush 19A are substantially closed, in the case of the pivot bearing that is illustrated in FIG. 4 of the drawings, by the corresponding arms 13 which arms are drawn towards one another by the respective pivot bolt 16 against the resistance of the interveningly sandwiched bushes 22 and ring 23 that surround the shank of the bolt 16. It will be seen from FIG. 4 of the drawings that the shank of the illustrated pivot bolt 16 is formed with a screwthread only throughout a short portion of its length that is remote from the head of the bolt, said screwthreaded portion co-operating with a fastening nut 25 that preferably, as illustrated, is of a known kind which incorporates an insert designed to resist the nut becoming loose when the implement of which it forms a part is in use. Each of the pivot bearings has a similar construction to that which has been described in detail for one of them with reference to FIG. 4 of the drawings.

The ring 26 of each eccentric mechanism 19 is arranged, through the intermediary of a ball bearing, around the periphery of a corresponding rotary eccentric disc 27 that is rigidly secured to a corresponding shaft 28 or 29 with its center significantly spaced from the longitudinal axis of that shaft. The shafts 29 are separate but coaxial output shafts of a central gear box 33 of the implement that will be referred to again below whereas the shafts 28, that are coaxial with the shafts 29, lie beyond the two shafts 29 in effective axial extension thereof. Each shaft 28 is rotatably journalled in a corresponding horizontal bearing that is carried by a bearing housing 30 mounted at the top of a bracket 31 which projects upwardly and rearwardly with respect to the direction A from the top of the frame beam 1. The adjacent or adjoining ends of the shafts 28 and 29 are splined and are drivingly interconnected by internally splined sleeves 32, the respective sleeves 32 being located adjacent to corresponding ones of the eccentric mechanisms 19 at the sides of those mechanisms which are remote from the central gear box 33. The ends of the two output shafts 29 of the gear box 33 which are located internally of that gear box carry corresponding bevel pinions 34 both of which have their teeth in mesh with those of a further bevel pinion 35 that is located internally of said gear box 33 at the end of a rotary input shaft 36 of the gear box. The rotary input shaft 36 extends substantially horizontally parallel to the direction A and its leading end, that projects forwardly from the front of the gear box, is splined or otherwise keyed to enable it to be placed in driven connection with the power take-off shaft at the rear of an agricultural tractor or other operating vehicle of the implement through the intermediary of a telescopic transmission shaft 37, which is of a construction that is known per se, having universal joints at its opposite ends. The central gear box 33 also contains a fourth bevel pinion 35A whose teeth are in mesh with those of both of the two bevel pinions 34. The pinion 35A is secured to the leading internal end of a substantially horizontal rotary output shaft 37A of the gear box 33 which shaft 37A has a rear splined or otherwise keyed end that projects outwardly from the gear box 33 at the back of the latter.

In addition to the substantially straight fastening portions 8 and 9 of the generally planar hook-shaped tines 10 and 11, each such tine 10 or 11 also includes a downwardly and forwardly directed portion 40 or 41 that is intergrally connected to the corresponding fastening portion 8 or 9 by curved bend 38 and 39. Each tine 10 and 11 is contained in a corresponding substantially vertical plane that is parallel or substantially parallel to the direction A and is so disposed that, when it is in a lowermost position of the path of repetitive upward and downward movement which it performs during operation of the implement, the lower edge of its downwardly and forwardly directed portion 40 or 41 is horizontal or substantially horizontal (see the lower edge of the portion 40 of the nearest tine 10 in FIG. 2 of the drawings). The upper edges of the portions 40 and 41 are inclined upwardly and rearwardly with respect to the direction A away from tips of said portions that are formed at the junctions between the upper and lower edges thereof, said tips of the portions 40 and 41 being located substantially vertically beneath the leading ends of the corresponding fastening portions 8 and 9 at least when the tines concerned occupy the lowermost positions in their paths of repetitive movement that have been referred to above. The upper edge of each tine portion 40 and 41 is provided at its opposite sides with four lugs that are formed with screwthreaded bores. Short countersunk screws (FIG. 3) firmly but releasably connect a blade 42 to said lugs and thus to the upper edge of the portion 40 or 41 of the tine 10 or 11 concerned. As can be seen in FIG. 1 of the drawings, the blades 42 have the shape which is known as "goosefoot" and come to points at their leading ends, said points being bevelled to provide cutting edges (see FIG. 2). The blades 42 may be considered as being hoe blades and it will be noted from FIG. 1 of the drawings that the strips of soil that will be worked by the respective blades 42 during the operation of the implement overlap one another so as to produce a single broad strip of worked ground throughout substantially the whole working width of the implement. It will be noted from the drawings that the principal difference between the tines 10 and 11 is that the angle which is enclosed between the longitudinal axis of a shorter tine fastening portion 8 of one of the tines 10 and the longitudinal axis of the corresponding downwardly and forwardly directed portion 40 is between 25° and 30° greater than the angle which is enclosed between the longitudinal axis of the longer fastening portion 9 of one of the tines 11 and the longitudinal axis of the downwardly and forwardly directed portion 41 thereof.

It will be apparent from FIG. 3 of the drawings that each group of pivot bolts 5, 7 12 and 15 are at the four corners of a pivotable polygonal linkage (in this case, a pivotable quadrilateral linkage) which linkage is not, however, a parallelogram linkage, the pivotal axes that coincide with the longitudinal axes of the bolts 5, 7, 12 and 15 all being substantially horizontally perpendicular to the direction A and parallel to the longitudinal axis of the frame beam 1. The distance between the two bolts 7 and 15 of each linkage that are at the tine side of that linkage is significantly less than the distance between the two bolts 5 and 12 that are at the frame side of the same linkage. The opposite ends of the frame beam 1 are closed by substantially vertical side plates 43 that are in parallel relationship with one another and parallel or substantially parallel relationship with the direction A, each side plate 43 having a portion that extends rearwardly from the frame beam 1 with respect to the direction A. Pairs of upper and lower pivot pins 44 turnably connect forks 46 at the leading ends of upper and lower arms 45 to locations at upper and lower corners of the rearwardly extending portions of the side plates 43. The arms 45 extend generally rearwardly from the pivot pins 44 with respect to the direction A and their rear ends carry further forks 46 that co-operate with corresponding upper and lower substantially horizontal pivot pins 47 in connecting the arms 45 to the upper and lower ends of upright supports 48 which are fastened to the opposite ends of a frame beam 49 of the implement that is in substantially horizontally parallel relationship with the frame beam 1 and that has substantially the same axial length as that frame beam 1. Although of smaller cross-sectional size than the frame beam 1, the hollow frame beam 49 also has a polygonal cross-section which it is preferred should be the square cross-section that is illustrated in the drawings, the beam 49 being arranged so that the lower surface thereof is substantially horizontally disposed. Two substantially vertical shafts 50 (FIGS. 1 and 6) are rigidly secured to the frame beam 49 at locations that are spaced inwardly from its opposite ends by substantially one-quarter of the total length of the beam. Each shaft 50 projects downwardly from beneath the bottom of the frame beam 49, a flange 51 that includes a collar of marginally greater diameter than the shaft 50 itself being welded to said shaft at a location spaced upwardly along the downwardly projecting portion thereof from the lowermost end of that portion. The downwardly projecting portion of each shaft 50 has a corresponding arm 52 turnably mounted thereon, each arm 52 projecting from its shaft 50 in two opposite directions. Each arm 52 comprises a central substantially cylindrical hub 53 that is formed internally at a location midway between its opposite upper and lower ends with a groove in which the outer edge of a resilient circlip 54 is lodged, it being noted that said circlip 54 is located at a horizontal level which is substantially midway between the lower end of the collar of the corresponding flange 51 and the lowermost end of the shaft 50 itself. Upper and lower identical roller bearings 55 are arranged internally of each hub 53, around the lower end of the corresponding shaft 50, their outer races abutting against the corresponding circlip 54 and their inner races abutting against the lower surface of the collar of the corresponding flange 51 and against a step in a corresponding retaining block 57 that is mounted beneath the lowermost end of each shaft 50 by a bolt 56 whose shank is screwed into a matchingly threaded axial bore that opens at the lowermost extremity of the shaft 50 concerned. The collar that is rigid with the flange 51 on each shaft 50 is surrounded, between that flange and the underlying upper roller bearing 55, by an oil or grease seal 56A. Similarly, a second step in each retaining block 57 is surrounded, between the underlying maximum diameter portion of that block and the overlying lower roller bearing 55, by a second oil or grease seal 56A.

Each of the opposite ends of each arm 52 carries a corresponding hub or sleeve 58 that is of substantially cylindrical configuration and that is similar in size and construction to the corresponding central hub 53. Each hub or sleeve 58 has a corresponding shaft 59 rotatably arranged therein and it will be apparent from a study of FIG. 6 of the drawings that each shaft 59 is rotatably mounted in the corresponding hub or sleeve 58 in the same manner as has already been described for the rotary mountings of the arms 52 on the shaft 50. There are only two significant differences in the arrangement, one being that the assembly of parts which rotatably connects each shaft 59 to each hub or sleeve 58 is inverted relative to the assembly of parts that rotatably connects each hub 53 to the corresponding shaft 50, and the other being that each shaft 59 is of stepped formation, the larger diameter portion thereof being located beneath the corresponding flange 51 so as to project downwardly towards the ground surface from the bottom of the hub or sleeve 58 concerned. The lowermost ends of the two shafts 59 that are disposed in advance of the frame beam 49 with respect to the direction A are welded or otherwise rigidly secured to a carrier 60 that extends substantially horizontally perpendicular to the direction A throughout substantially the whole of the working width of the implement. The carrier 60 is in the form of a heavy gauge bar or beam of L-shaped cross-section that is arranged with the junction between its limbs lowermost, and in contact with the ground surface when the implement is in operation, said limbs diverging upwardly ad and forwardly, and upwardly and rearwardly, respectively, away from the junction therebetween with the leading limb somewhat more steeply inclined to the horizontal than the rear limb (see FIG. 6). The lowermost ends of the shafts 59 are secured to the carrier between the limbs thereof and this connection is reinforced by the provision of rectangular fastening plates 61 that rigidly interconnect the free edges of the limbs of the carrier 60 in the regions of the two shafts 59, said shafts 59 being entered through substantially central holes in the plates 61 and the margins of those holes being welded or otherwise rigidly secured to the shafts 59. The rear limb of the carrier 60 that is less steeply inclined to the horizontal than is the leading limb thereof is provided with a single row of regularly spaced apart rigid tines 62, each tine 62 having a conical soil working portion 63 that terminates in a point at its lowermost and rearmost end with respect to the direction A and also a fastening portion 64 that includes a shoulder formed between a short plain part and a smaller diameter screwthreaded part, said screwthreaded part being entered through a corresponding hole in the rear limb of the carrier 60 and being furnished with a nut 65 that is tightened to draw the shoulder in the fastening portion into firm engagement with said limb of the carrier 60. The nuts 65 preferably, but not essentially, include insert designed to prevent them from working loose when the implement is in operation. It will be seen from FIG. 6 of the drawings that, with this arrangement, the longitudinal axis of the soil working portion 63 of each tine 62 is parallel or substantially parallel to the leading limb of the carrier 60 and is thus inclined to the vertical at an angle which it is preferred should not be less than substantially 20°. It will be remembered that the hubs or sleeves 58 which are to the rear of the beam 49 with respect to the direction A also rotatably carry corresponding shafts 59 and it can be seen in the drawings that the lower larger diameter ends of those shafts 59 are rigidly secured to a second carrier 60 which is parallel to the carrier 60 that has already been described and whose construction and mounting are identical to that of the first mentioned carrier 60.

Arms 66 that extend substantially horizontally parallel to the direction A have their leading ends rigidly secured to lower portions of the two upright supports 48 that are fastened to the opposite ends of the frame beam 49. The rear ends of the two arms 66 carry substantially horizontally aligned bearings between which a rotatable supporting member in the form of an open ground roller 67 is supported so as to be freely rotatable about its own longitudinal axis which latter extends substantially horizontally perpendicular to the direction A in parallel or substantially parallel relationship with the longitudinal axes of the frame beams 1 and 49. The roller 67 has a central tubular carrier or support 68 to which the centers of a plurality, such as five, of circular support plates 69 are secured at regularly spaced apart intervals which are such that two of the plates 69 are located very close to the opposite ends of the carrier or support 68. The support plates 69 are substantially vertically disposed in parallel relationship with one another and parallel or substantially parallel relationship with the direction A, each plate 69 being provided around its periphery with a plurality, such as twelve, of regularly spaced apart holes through atleast some of which are entered elongate tubular or rod-shaped elements 70. It can be seen from FIG. 1 of the drawings that the elements 70 are preferably, but not absolutely essentially, arranged so as to extend helically around the longitudinal axis of the carrier or support 68 which axis coincides with the axis of rotation of the whole roller 67.

Two pairs of lugs 71 (FIGS. 2 and 3) are secured to the lower surface of the frame beam 1 at two locations which are spaced by equal distances from the midpoint of the length of that frame beam. The lugs 71 are sector-shaped and the rearmost ends of the two lugs 71 of each pair are interconnected by a corresponding substantially horizontal pivot pin 72 that is in parallel relationship with the frame beam 1. An arm 73 is turnably mounted on each pivot pin 72, between the lugs 71 of the corresponding pair, and projects downwardly and forwardly from between the lugs 71 with respect to the direction A. The lugs 71 are formed, close to their leading curved edges, with curved rows of holes that are equidistant from the axis defined by the corresponding pivot pin 72 and each arm 73 is formed with a transverse opening that will register with any chosen ones of the holes in said rows. Substantially horizontal locking pins 74 are provided for entry through chosen holes in the lugs 71 and through the intervening openings in the arms 73 and it will be apparent that the particular holes which are chosen dictate the angular positions of the arms 73 about the common axis that is defined by the pivot pins 72 as seen in FIGS. 2 and 3 of the drawings. The arms 73 are of channel-shaped cross-section and the openings therein that co-operate with the locking pins 74 are formed in their limbs. The leading ends of the two arms 73 with respect to the direction A are rigidly interconnected by a levelling beam 75 that extends substantially horizontally perpendicular to the direction A throughout substantially the whole of the working width of the implement. The levelling beam 75 is in the form of a heavy gauge bar or beam of L-shaped cross-section that is arranged with the junction between its limbs lowermost, and in contact with the ground surface when the implement is in operation, said limbs diverging upwardly and forwardly, and upwardly and rearwardly, respectively, away from that junction. As can be seen in FIG. 2 of the drawings, the leading limb of the beam 75 with respect to the direction A is usually somewhat less steeply inclined to the horizontal than is the rearmost limb thereof but it will be appreciated that this relationship depends upon the particular angular settings of the arms 73 that are chosen about the common axis which is defined by the pivot pins 72. Two further pairs of lugs 76 project upwardly and forwardly with respect to the direction A from the leading surface of the frame beam 1 at two locations which are spaced apart from the midpoint of that beam by smaller distances than the spacing therefrom of the sector-shaped lugs 71. The lugs 76 of each pair are constructed and arranged to co-operate, by way of substantially horizontal pivot pins, with the free ends of the lower lifting links of a three-point lifting device or hitch at the rear of an agricultural tractor or other operating vehicle in the generally known manner that is illustrated somewhat diagrammatically in the drawings. The pairs of lugs 76 thus afford the two lower coupling points of a coupling member or trestle of the implement, the third upper coupling point thereof being defined at the top of two symmetrically similar or identical upwardly convergent plates 77 whose lower ends are secured to the top of the frame beam 1 and to the inner lugs 76 of the two pairs. A horizontal pivot pin interconnects the upper extremities of the two plates 77 and co-operates, in known manner, with the free end of the upper adjustable length lifting link of the three-point lifting device or hitch of an agricultural tractor or other operating vehicle.

The top of the frame beam 49 is provided, at substantially the center of the transverse length of that beam, with a rigidly mounted support 78 (FIG. 5) which projects rearwardly behind the beam 49 with respect to the direction A. The support 78 is of heavy gauge inverted channel-shaped configuration, the lowermost edges of its two limbs being welded or otherwise rigidly secured to the top of the beam 49. A large opening is formed in the uppermost web or base of the support 78 at a location to the rear of the beam 49 with respect to the direction A and a sleeve 79 whose major portion projects downwardly from said web or base is secured in the opening by a flange 79A of the sleeve that is fastened to the web or base of the support 78 by bolts 79B. A substantially vertical shaft 81 that extends axially through the sleeve 79 is rotatably mounted in that sleeve by upper and lower roller bearings 80 that are spaced apart from one another by a significant axial distance so as to lie close to the uppermost end of the sleeve 79 and towards the lowermost end thereof, respectively. An oil or grease seal 82 lies immediately beneath the lower roller bearing 80 in surrounding relationship with a smaller diameter step in a stepped plug 83 which surrounds the shaft 81 and substantially closes the lower end of the sleeve 79. The plug 83 is welded or otherwise rigidly secured to the upper surface of an arm 84 at substantially the midpoint of that arms, said arm also being rigidly secured to the lowermost end of the shaft 81 so as to project both forwardly in front of, and rearwardly behind, said shaft. The end of the arm 84 that projects rearwardly from the shaft 81 has the top of a substantially vertical shaft 85 welded or otherwise rigidly secured to it, a hub or sleeve 86 being rotatably mounted around the shaft 86 by an assembly of parts 54 to 57 inclusive that is substantially identical in construction and operation to the assemblies of part having the same reference numbers which have already been described above in relation to FIG. 6 of the drawings. The outer surface of the hub or sleeve 86 is secured to one end of a tubular arm 87 (FIGS. 1 and 5) whose opposite end is secured to a hub or sleeve 88 arranged turnably around a stub shaft 89 by a further assembly of parts 54 to 57 inclusive that is not illustrated in detail in the drawings. The stub shaft 89 extends downwardly from the hub of sleeve 88 and has its lowermost end rigidly connected to the rearmost one, with respect to the direction A, of the two substantially identical carriers 60, one of which has been described in detail above. The shaft 81 projects upwardly from above the upper roller bearing 80 into a gear box 90 that is secured to the top of the support 78 in register with the upper end of the sleeve 79. Said end of the shaft 81 is splined in the gear box 90 and carries a bevel pinion 91 whose teeth are in driven mesh with those of a further bevel pinion 92 that is mounted inside the gear box 90 at the rearmost end of a rotary input shaft 93 of the gear box which extends substantially horizontally parallel to the direction A with its leading splined or otherwise keyed end projecting forwardly from a bearing housing 95 that is mounted at the front of the gear box 90 to carry two closely spaced roller bearings 94 of the shaft 93. When the implement is in use, a short telescopic transmission shaft 97 (FIGS. 1, 2 and 3) that is of a construction which is known per se, having universal joints 96 at its opposite ends, places the rotary input shaft 93 of the gear box 90 in driven connection with the rotary output shaft 37A of the central gear box 33.

In the use of the soil culitvating implement or machine that has been described with reference to FIGS. 1 to 6 of the drawings, its coupling member or trestle is connected to the three-point lifting device or hitch at the rear of an agricultural tractor or other operating vehicle using the pairs of lugs 76 and the upwardly convergent plates 77 in the manner that has been described above. The forwardly projecting rotary input shaft 36 of the central gear box 30 is placed in driven connection with the power take-off shaft of the same agricultural tractor or other operating vehicle using the known telescopic transmission shaft 37 that has universal joints at its opposite ends. Before work commences, if necessary, the maximum depth to which the hook-shaped tines 10 and 11 and their hoe-like blades 42 can penetrate into the soil is adjusted by temporarily removing the locking pins 74 and turning the arms 73 which carry the levelling beam 75 either upwardly, or downwardly, about the common axis defined by the pivot pins 72, the locking pins 74 being replaced when a new setting has been attained. It is also possible to control the depth to which the tines 62 will penetrate into the top soil by fixing the angularity of a dual parallelogram linkage 98 that comprises the pairs of arms 45. The locking device that is provided for this purpose comprises arms 99 pivotally connected to lugs 100 carried by the lower arms 45 and strips 103 which project from the lower edges of the upper arms 45, each strip 103 being formed with a row of holes 102. The ends of the arms 99 that are remote from the lugs 100 are forked and provided with substantially horizontal locking pins 101 and it will be evident from FIG. 2 of the drawings that each locking pin 101 can be entered through any chosen one of the holes 102 in the corresponding strip 103. In the particular example which is being described, each strip 103 has three of the holes 102 but this is not, of course, essential and other numbers of the holes 102 could equally well be provided.

Once any initial adjustments that are necessary have been made, the implement or machine is moved operatively in the direction A by the agricultural tractor or other vehicle to whose three-point lifting device or hitch it is connected, the levelling beam 75 initially substantially flattening the surface of the land that is to be dealt with throughout substantially the whole of the working width of the implement. The strip of soil that is flattened by the levelling beam 75 is immediately subsequently acted upon by the hook-shaped tines 10 and 11 and their hoe-like blades 42. The tines 10 and 11 occupy substantially the positions that are shown in FIG. 2 of the drawings during operation and thus penetrate into the soil to a depth which is sufficient for thorough cultivation thereof. The tines 10 and 11 are moved upwardly and downwardly in a repetitive manner by the six eccentric mechanisms 19 of which there is one per tine 10 or 11. The construction and arrangement of the pivotable polygonal linkages by which the six tines 10 and 11 are connected to the frame of the implement are such that, when the mechanisms 19 are driven, each of the tines 10 and 11 tends to rock upwardly and downwardly about a point that is located beneath the ground surface near the free end or tip of the portion 40 or 41 of the tine concerned. The upwardly and rearwardly inclined upper surfaces of the blades 42 tend to lift and break up the soil that is immediately above them and this action is, of course, greatly enhanced by the positive upward and downward rocking motion of the tines 10 and 11 of which the blades 42 effectively form parts. The points about which the tines 10 and 11 tend to rock are located at substantially constant depths beneath the ground surface and thus, despite the upward and downward motion of the tines 10 and 11, the depth of soil that is worked by the implement remains substantially fixed throughout the area of land that is cultivated during any particular period of operation. It will be noted from FIGS. 1 to 3 of the drawings that the eccentric discs 27 of immediately neighbouring mechanisms 19 are offset about the common longitudinal axis of the composite shaft 28 and 29 by substantially 180° as regards their eccentricity and this arrangement tends to reduce the vibration that occurs during operation since, at any particular instant at which the three tines 10 are moving downwardly, the three tines 11 will be moving upwardly, and vice versa.

After the soil has been coarsely crumbled by the tines 10 and 11 and their blades 42 down to, for example, a depth approximately equivalent to that of a conventional plough furrow, the upper layer of the top soil is further, and more finely, crumbled by the tines 62, the two rows of those tines 62 being caused to reciprocate in directions that are substantially horizontally perpendicular to the direction A by the drive that is transmitted to them from the rotary output shaft 37A of the central gear box 33 by way of the transmission shaft 97, the gear box 90, the shaft 81, the arm 84, the shaft 85, the arm 87 and the stub shaft 89. It will be apparent that the arms 52 are oscillated continuously about the axes of the shafts 50 by this drive and that said oscillation is transformed in to reciprocation of the carriers 60 and thus of the tines 62. The longitudinal axis of each tine 62 is obliquely disposed in a corresponding substantially vertical plane that is parallel or substantially parallel to the direction A with the uppermost end of the tine further advanced in that direction than the lowermost substantially pointed free end or tip of the soil working portion 63 thereof. The arrangement is such that no significant forces act upon the tines 62 in a way which would tend to turn them around the longitudinal axes of their fastening portions 64. Although the leading upwardly and forwardly inclined limbs of the two carriers 60 with respect to the direction A do not carry any tines or the like, it will be apparent from FIGS. 2 and 6 of the drawings that those limbs will inevitably have a levelling effect upon the surface of the soil that has already been coarsely broken up by the hook-shaped tines 10 and 11 and their blades 42, the junctions between the limbs of the carriers 60 being located at a lower horizontal level than are the fastening portions 64 of the immediately following tines 62. The open ground roller 67 that is located at the rear of the implement with respect to the direction A performs a final crumbling, smoothing and gentle compressing action upon the surface layer of top soil so that, in a single traverse, the implement will coarsely work a layer of top soil, and sometimes also some sub-soil, down to a depth that may advantageously be approximately equal to the depth of conventional plough furrow, the uppermost layer of the top soil then being more finely crumbled and finally being smoothed and gently compressed to bring it to a condition in which it is ready for the reception of seeds or small plants. The uppermost layer of the top soil is brought to a substantially optimum condition for the germination of seeds or for the growing on of small plants while the underlying soil is broken up to an extent such that it will contain a sufficient quantity of water and air to promote rapid and healthy growth of the roots of seedlings and/or young plants.

FIGS. 7 and 8 of the drawings illustrate an alternative form of soil cultivating implement or machine in accordance with the invention, which implement or machine is, however, identical, or very similar, in many respect to the implement or machine of FIGS. 1 to 6 of the drawings. This being the case, many of the parts of the implement or machine of FIGS. 7 and 8 of the drawings are indicated by the same references as are used in FIGS. 1 to 6 thereof and do not, of course, require a repeated description. In this embodiment, a beam 104 that extends substantially horizontally parallel to the frame beam 1 has forwardly projecting upright supports at its opposite ends and those supports are connected to the forks 46 at the rearmost ends of the upper and lower arms 45 of the dual parallelogram linkage 98 so that said beam 104 can be turned upwardly and downwardly, without significant tilting, relative to the frame beam 1. A plurality (in this case, six) of sleeves 105 of oblong cross-section are rigidly secured to the rear surface of the hollow formation and square cross-section beam 104 at locations that are in register, in the direction A, with the six tines 10 and 11. Each sleeve 105 receives a corresponding carrier strip 106 that is slidable upwardly and downwardly therein, the sleeves 105 being provided with horizontal locking pins that will enter holes (not shown) in the carrier strips 106 to maintain those strips at corresponding positions of downward extension beyond the lowermost ends of the sleeves 105. The lowermost end of each strip 106 carries a corresponding pair of ridging bodies 107 which bodies, due to the disposition of the sleeves 105, are in register with corresponding ones of the tines 10 and 11 in the direction A. Thus, when the implement is in operation, the pairs of ridging bodies 107 will move through the soil that has been displaced by the respective tines 10 and 11, and particularly by their blades 42, and will displace the coarsely crumbled soil laterally with respect to the direction A to form ridges between the facing bodies 107 of the successive pairs, it being noted that said pairs of ridging bodies 107 are adjustable, in known manner, as regards their total widths so that the distance between the facing bodies 107 of two spaced pairs can be increased, or decreased, by decreasing, or increasing, respectively, the total width of each of those pairs of bodies 107. The implement can thus be used to form coarsely crumbled top soil into a plurality of ridges that extend in the direction A in horizontally spaced apart relationship, such ridges being very well suited to the growing of patatoes and some other tuber crops.

The implement of FIGS. 7 and 8 of the drawings is suitable for preparing soil in a single path for the growing of patatoes and other tuber crops whereas the implement of FIGS. 1 to 6 of the drawings is particularly suitable for preparing soil, in a single pass, for the sowing of seeds or for the growing on of small plants. In both cases, the soil is initially coarsely crumbled down to a depth which may advantageously be equivalent to the depth of a conventional plough furrow so that said soil is given a very porous structure that facilitates the retention of air and moisture, this being advantageous to the root development, in particular, of seedings and young plants. In this case of the implement of FIGS. 1 to 6 of the drawings, the upper layer of top soil is subject to a further finer crumbling action by the carriers 60 and by their tines 62 followed by a final crumbling, levelling and gentle compressing action by the ground roller 67. This upper layer of top soil is thus brought to a substantially optimum condition for the germination of seeds and for the growing on of young plants. In either case, the implement works the soil to a substantially constant depth throughout the area of the land upon which it is used, that depth being adjustable to suit the nature and condition of the soil and the requirements of the crop which it is subsequently to grow.

Although various features of the soil cultivating implements or machines that have been described and/or that are illustrated in the accompanying drawings will be set forth in the following claims as inventive features, the invention is not necessarily limited to those features and includes within its scope each of the parts of each soil cultivating implement or machine embodiment that has been described, and/or that is illustrated in the accompanying drawings, both individually and in various combinations.

What we claim is:

1. A soil cultivating implement comprising a frame and a plurality of soil working members pivoted on said frame in a row that extends transverse to the direction of travel, said members having tools located adjacent one another in working positions and driving means connected to said members to repetitively pivot said tools upwardly and downwardly to work adjoining strips of soil, said driving means comprising a central gear box and respective eccentric mechanisms engaged by shaft means turned by gears in said box, said mechanisms being mounted on separate shafts which are drivenly interconnected by sleeves, those mechanisms located adjacent opposite sides of said gear box being mounted on output shafts from said box and said output shafts being in driving connection with the separate shafts to which the other mechanisms are connected, said gears being connectable to a power take-off shaft of a tractor to which said implement can be coupled.

2. An implement as claimed in claim 1, wherein further said working members on reciprocable means are supported by said frame to the rear of said first mentioned members, said further members being reciprocable to and fro by said driving means to further work the soil.

3. An implement as claimed in claim 1, wherein each soil working member is connected to said frame through a pivotable polygonal linkage, said linkage being quadrilateral in configuration and having two upper pivot points on said frame and two lower pivot points connected to a fastening portion of the corresponding soil working member.

4. An implement as claimed in claim 3, wherein the distance between the two lower pivot points is less than the distance between the two upper pivot points, all of said pivot points defining axes which extend transverse to the direction of travel.

5. An implement as claimed in claim 4, wherein, as seen in side elevation, a line intersecting a forward two pivot points meets a line intersecting a rearmost two pivot points to define a further point about which said soil working portion rocks repetitively upwards and downwards.

6. An implement as claimed in claim 5, wherein the rearmost points of said linkage are connected by an arm to a respective eccentric mechanism of said driving means, neighboring mechanisms having eccentric discs spaced apart and offset from one another around their axes of rotation by an angle of substantially 180°.

7. An implement as claimed in claim 3, wherein a ground contacting leveling member extends in advance of said soil working members from at least one pivot arm connection to the frame, means locking said arm in any one of a plurality of positions to regulate the working depth of said soil working means.

8. A soil cultivating implement comprising a frame and a plurality of soil working members pivoted on said frame in a row that extends transverse to the direction of travel, said members being positioned adjacent one another and being repetitively upwardly and downwardly displaceable in the soil, driving means connected to displace said members and work the soil, each member comprising a downwardly and rearwardly inclined fastening portion that is connected to a forwardly directed portion by a bend, lower edges of said forwardly directed portion being substantially horizontal when the corresponding members occupy operative positions, the fastening portions of neighboring members having different lengths and their forwardly directed portions being located at substantially the same horizontal level, said driving means being connected to said fastening portions.

9. An implement as claimed in claim 8, wherein said forwardly directed portion has a hoe-like blade of goose-foot configuration, said blade being inclined upwardly and rearwardly from a leading end thereof.

10. An implement as claimed in claim 9, wherein the blades of said members are positioned to work adjoining strips of soil during travel.

11. An implement as claimed in claim 10, wherein neighboring soil working members are offset relative to one another in the direction of travel of the implement.

12. An implement as claimed in claim 8, wherein each of the shorter fastening portions have longitudinal axes inclined to the longitudinal axis of a corresponding forwardly extending portion at an angle which is between about 25° to 30° greater than the angle between the longitudinal axes of the corresponding portions of those members which have longer fastening portions.

13. A soil cultivating implement comprising a frame and movable soil working means mounted on said frame, driving means connected to move said soil working means and work the soil, said working means comprising at least one elongated support that extends transverse to the direction of travel and said support being pivotable about an upwardly extending axis, said driving means connected to reciprocate the support in directions transverse to the direction of travel, a plurality of tines carried by said support along the length thereof and said tines having longitudinal axes that are contained in substantially vertical planes that extend substantially parallel to the direction of travel, said axes being inclined both to the horizontal and to the vertical, said support comprising bar means that has a soil deflecting surface and said surface extending upwardly and being inclined forwardly with respect to the normal direction of travel of the implement, said bar means being a bar of angular cross-section with limbs that diverge upwardly away from a junction between said limbs, said limbs being of substantially identical configuration and a leading limb being inclined to the horizontal at a greater angle than that of a rear limb.

14. An implement as claimed in claim 13, wherein said tines are secured to the rear limb of the bar and the junction is located at a lower horizontal level than are fastening postions of said tines.

* * * * *